UNITED STATES PATENT OFFICE 2,743,259
Patented Apr. 24, 1956

2,743,259

CERTAIN HYDROXYLATED PHENOL-ALDEHYDE RESINS AND METHOD OF MAKING SAME

Melvin De Groote, University City, Mo., assignor to Petrolite Corporation, Wilmington, Del., a corporation of Delaware No Drawing. Application November 19, 1952, Serial No. 321,495

8 Claims. (Cl. 260—53)

The present invention relates to certain hydroxylated phenol-aldehyde resin derivatives obtained by reacting certain fusible phenol-aldehyde resins with an aralkylene oxide of the kind hereinafter described. The invention also includes a method for producing such modified phenol-aldehyde resins.

The preparation of oxyalkylation-susceptible, fusible, organic solvent-soluble, water-insoluble, phenol-aldehyde resins is well known. Such resins may be derived by reaction between a difunctional monohydric phenol and an aldehyde having not over 8 carbon atoms and reactive toward said phenol. One procedure produces the resin in the substantial absence of trifunctional phenols and employs a phenol of the formula

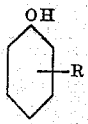

in which R is a hydrocarbon radical having not more than 24 carbon atoms and substituted in the 2,4,6 position. Such phenols are described, for example, in U. S. Patents Nos. 2,499,365, 2,499,367, 2,499,368, and 2,499,370, all dated March 7, 1950, to De Groote et al.

Aforementioned U. S. Patent No. 2,499,368 describes an oxyalkylation-susceptible, fusible, organic solvent-soluble, water-insoluble, phenol-aldehyde resin which is derived by reaction between a difunctional monohydric phenol and an aldehyde having not over 8 carbon atoms and reactive toward said phenol; said resin being formed in the substantial absence of trifunctional phenols; said phenol being of the formula

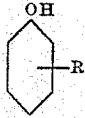

in which R is a hydrocarbon radical having not more than 24 carbon atoms and substituted in the 2,4,6 position.

U. S. Patent No. 2,499,370 describes an oxyalkylation-susceptible, fusible, organic solvent-soluble, water-insoluble phenol-aldehyde resin; said resin being derived by reaction between a difunctional monohydric phenol and an aldehyde having not over 8 carbon atoms and reactive toward said phenol; said resin being formed in the substantial absence of trifunctional phenols; said phenol being of the formula

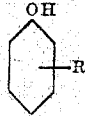

in which R is a hydrocarbon radical having at least 4 and not more than 12 carbon atoms and substituted in the 2,4,6 position.

The present invention preferably involves the use of a phenol-aldehyde resin of the kind just described, with the proviso that the hydrocarbon radical shall have at least 4 and not over 18 carbon atoms.

More specifically, my invention is concerned with the process of reacting an aralkylene oxide having the general formula

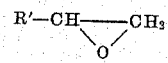

wherein R' stands for a substituted or unsubstituted phenyl or naphthyl radical, with an oxyalkylation-susceptible, fusible, organic solvent-soluble, water-insoluble phenol-aldehyde resin; said resin being derived by reaction between a difunctional monohydric phenol and an aldehyde having not over 8 carbon atoms and reactive toward said phenol; said resin being formed in the substantial absence of trifunctional phenols; said phenol being of the formula

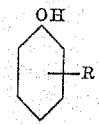

in which R is a hydrocarbon radical having not more than 24 carbon atoms and substituted in the 2,4,6 position, the resultant product in turn also being an oxyalkylation-susceptible, fusible, organic solvent-soluble, water-insoluble resin.

The present invention is concerned with the modification of such resins which involves the introduction of (a) a phenolic nucleus which may or may not be substituted, (b) conversion of the hydroxyl into an ether linkage, and (c) the introduction of an alkanol hydroxyl radical as differentiated from a phenolic hydroxyl radical. Actually, both types of hydroxyl radicals may be present as indicated subsequently. This is accomplished by reacting the resin with an aralkylene oxide of the kind previously described, and described in the literature as, for example, in U. S. Patent No. 2,422,637 dated June 17, 1947, to Thomas. More specifically, the aralkylene oxides have the general formula, as previously noted, to wit

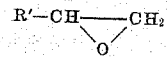

wherein R' stands for a substituted or unsubstituted phenyl or naphthyl radical. Illustrative of aralkylene oxides having the above general formula and particularly suited for the instant invention may be mentioned styrene oxide; nuclearly alkyl substituted styrene oxides such as ortho-, meta- or para-methylstyrene oxide, ortho-, meta- or para-ethylstyrene oxide, ortho-, meta- or para-isopropylstyrene oxide or ortho-, meta- or para-tert-butylstyrene oxide; ortho-, meta- or para-aminostyrene oxide; ortho-, meta- or para-hydroxystyrene oxide; nuclear alkoxy styrene oxides such as ortho-, meta- or para-methoxystyrene oxide, ortho-, meta- or para-ethoxystyrene oxide or ortho-, meta- or para-propoxystyrene oxide; nuclearly arylated styrene oxides such as ortho-, meta- or para-phenyl-styrene oxide and compounds in which the nuclear aryl substituent is further substituted such as para-(para-hydroxyphenyl) styrene oxide or para-(ortho-amino-phenyl) styrene oxide; aralkylene oxides containing condensed ring nuclei such as alpha-naphthyl-ethylene oxide, beta-naphthylethylene oxide, beta-hydroxy-alpha-naphthylethylene oxide, and alpha-methyl-beta-naphthylethylene oxide, etc.

More specifically, in its preferred aspect my invention is concerned with a process for reacting (A) An oxyalkylation-susceptible, fusible, organic solvent-soluble, water-insoluble phenol-aldehyde resin; resin being derived by reaction between a difunctional monohydric phenol and an aldehyde having not over 8 carbon atoms and reactive toward said phenol; said resin being formed in the substantial absence of trifunctional phenols; said phenol being of the formula

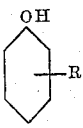

in which R is a hydrocarbon radical having at least 4 and not over 18 carbon atoms and substituted in the 2,4,6 position; and (B) An aralkylene oxide of the general formula

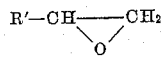

in which R' stands for a substituted or unsubstituted phenyl or naphthyl radical; said reaction between (A) and (B) being conducted below the pyrolytic point of the reactants and resultants of reaction.

Resins of the kind described in aforementioned U. S. Patent No. 2,499,368 serve as suitable reactants for use in the present invention. As stated, such resins are reacted with an aralkylene oxide as previously described. The ratio employed is at least 2 moles of oxide per mole of resin, i. e., at least sufficient oxide to convert 2 hydroxyls per phenolic resin into the desired derivative. This phase of the invention will be described in greater detail subsequently. The product so obtained is susceptible for use in a variety of applications.

For purpose of convenience, what is said hereinafter will be divided into three parts:

Part 1 will be concerned with the preparation of suitable phenol-aldehyde resins;

Part 2 will be concerned with the reaction involving the phenol-aldehyde resin and the aralkylene oxide, and Part 3 will be concerned with uses for which the product or products described in Part 2 are particularly suitable.

PART 1

It is well known that one can readily purchase on the open market, or prepare, fusible, organic solvent-soluble, water-insoluble resin polymers of a composition approximated in an idealized form by the formula

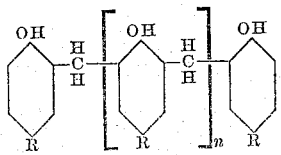

In the above formula $n$ represents a small whole number varying from 1 to 6, 7 or 8, or more, and in some instances as much as 10 or 12. As previously pointed out R represents a hydrocarbon radical having not over 24 carbon atoms and preferably represents an alkyl radical having 4 to 18 carbon atoms. Whereas the divalent radical bridge is shown as being derived from formaldehyde it may, of course, be derived from any other reactive aldehyde having 8 carbon atoms or less.

As previously stated, the preparation of resins of the kind herein employed as reactants, is well known. See previously mentioned U. S. Patent No. 2,499,368. Resins can be made using an acid catalyst or basic catalyst or a catalyst having neither acid nor basic properties in the ordinary sense or without any catalyst at all. It is preferable that the resins employed be substantially neutral. In other words, if prepared by using a strong acid as a catalyst, such strong acid should be neutralized. Similarly, if a strong base is used as a catalyst it is preferable that the base be neutralized although I have found that sometimes the reaction described proceeded more rapidly in the presence of a small amount of a free base. The amount may be as small as .02% or as much as a few tenths of a per cent. Sometimes moderate amounts of caustic soda and caustic potash may be used. However, the most desirable procedure in practically every case is to have the resin neutral.

In preparing resins one does not obtain a single polymer, i. e., one having just 3 units, or just 4 units, or just 5 units, or just 6 units, etc. It is usually a mixture; for instance, one of approximately 4 phenolic nuclei will have some trimer and pentamer present. Thus, the molecular weight may be such that it corresponds to a fractional value for $n$ as, for example, 3.5, 4.5 or 5.2.

As has been pointed out previously, as far as the resin unit goes one can use a mole of aldehyde other than formaldehyde, such as acetaldehyde, propionaldehyde or butyraldehyde. The resin unit may be exemplified thus:

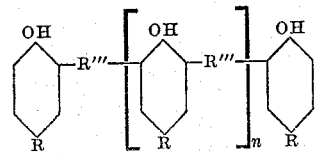

in which R''' is the divalent radical obtained from the particular aldehyde employed to form the resin. For reasons which are obvious the condensation product obtained appears to be described best in terms of the method of manufacture.

In the actual manufacture of the resins I found no reason for using other than those which are lowest in price and most readily available commercially. For purpose of convenience suitable resins are characterized in the following table:

TABLE I

| Ex. No. | R | Position of R | R''' derived from— | $n$ | Mol. wt. of resin molecule (based on $n+2$) |
|---|---|---|---|---|---|
| 1a | Phenyl | Para | Formaldehyde | 3.5 | 992.5 |
| 2a | Tertiary butyl | do | do | 3.5 | 882.5 |
| 3a | Secondary butyl | Ortho | do | 3.5 | 882.5 |
| 4a | Cyclohexyl | Para | do | 3.5 | 1,025.5 |
| 5a | Tertiary amyl | do | do | 3.5 | 959.5 |
| 6a | Mixed secondary and tertiary amyl | Ortho | do | 3.5 | 805.5 |
| 7a | Propyl | Para | do | 3.5 | 805.5 |
| 8a | Tertiary hexyl | do | do | 3.5 | 1,036.5 |
| 9a | Octyl | do | do | 3.5 | 1,190.5 |
| 10a | Nonyl | do | do | 3.5 | 1,267.5 |
| 11a | Decyl | do | do | 3.5 | 1,344.5 |
| 12a | Dodecyl | do | do | 3.5 | 1,498.5 |
| 13a | Tertiary butyl | do | Acetaldehyde | 3.5 | 945.5 |
| 14a | Tertiary amyl | do | do | 3.5 | 1,022.5 |
| 15a | Nonyl | do | do | 3.5 | 1,330.5 |
| 16a | Tertiary butyl | do | Butyraldehyde | 3.5 | 1,071.5 |
| 17a | Tertiary amyl | do | do | 3.5 | 1,148.5 |
| 18a | Nonyl | do | do | 3.5 | 1,456.5 |
| 19a | Tertiary butyl | do | Propionaldehyde | 3.5 | 1,008.5 |
| 20a | Tertiary amyl | do | do | 3.5 | 1,085.5 |
| 21a | Nonyl | do | do | 3.5 | 1,393.5 |
| 22a | Tertiary butyl | do | Formaldehyde | 4.2 | 996.6 |
| 23a | Tertiary amyl | do | do | 4.2 | 1,083.4 |
| 24a | Nonyl | do | do | 4.2 | 1,430.6 |
| 25a | Tertiary butyl | do | do | 4.8 | 1,094.4 |
| 26a | Tertiary amyl | do | do | 4.8 | 1,189.6 |
| 27a | Nonyl | do | do | 4.8 | 1,570.4 |
| 28a | Tertiary amyl | do | do | 1.5 | 604.0 |
| 29a | Cyclohexyl | do | do | 1.5 | 646.0 |
| 30a | Hexyl | do | do | 1.5 | 653.0 |
| 31a | do | do | Acetaldehyde | 1.5 | 688.0 |
| 32a | Octyl | do | do | 1.5 | 786.0 |
| 33a | Nonyl | do | do | 1.5 | 835.0 |
| 34a | Octyl | do | Butyraldehyde | 2.0 | 986.0 |
| 35a | Nonyl | do | do | 2.0 | 1,028.0 |
| 36a | Amyl | do | do | 2.0 | 860.0 |
| 37a | Butyl | do | Formaldehyde | 2.0 | 636.0 |
| 38a | Amyl | do | do | 2.0 | 692.0 |
| 39a | Hexyl | do | do | 2.0 | 748.0 |
| 40a | Cyclohexyl | do | do | 2.0 | 740.0 |

PART 2

In the broadest sense the aralkylene oxides of the structure

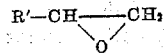

wherein R' stands for a substituted or unsubstituted phenyl or naphthyl radical, may be considered as substituted ethylene oxides and under certain conditions will react in substantially the same manner as ethylene oxide, but in other instances will react somewhat differently to produce products which apparently are entirely different than the analogous products derived from ethylene oxide. For instance, aforementioned U. S. Patent No. 2,499,370 describes the reaction of a phenol-aldehyde resin of the kind described in Part 1, immediately preceding, with ethylene oxide or the like, to yield products which are water-dispersible or water-soluble. The instant invention is concerned with reacting the same resins with styrene oxide or the equivalent in a manner to produce a somewhat similar structure but devoid of water solubility or dispersibility and, indeed, a resin in which the hydrophobe character is probably increased. Such new resin derivative, of course, can be reacted with ethylene oxide or the like with the objective of introducing hydrophile character, but this particular procedure is not a part of the present invention.

The reaction product herein obtained must yield a liquid or thermoplastic resin or resin derivative.

Reference is made to aforementioned U. S. Patent No. 2,422,637. This particular patent describes a reaction involving phenol (hydroxybenzene) and an aralkylene oxide, particularly styrene oxide. The patent may be exemplified by claim 2 which is as follows: "The resinous condensation product formed by heating phenol together with from 50% to 20% by weight thereof of styrene oxide."

The procedure itself may be indicated by the following excerpts from the patent:

"Heat the phenolic constituent, alone, to its boiling point, and add to it, with stirring, a quantity of an aralkylene oxide which is equivalent to, say, from 50% to 200% by weight of the phenol. The phenol and aralkylene oxide may be employed in widely varying proportions. However, somewhat better results are obtained within the proportions indicated. Under these conditions the reaction is quite vigorous and condensation is completed upon the addition of the total amount of the aralkylene oxide which is to be employed, i. e., generally in from about 1 to 4 hours, depending upon the reaction quantities and temperatures employed. More rapid addition of the aralkylene oxide to the phenol sometimes results in too vigorous a reaction, in which case it may be necessary to control the condensation by applying cooling fluids to the reaction vessel."

"When an excess of phenol (present in the styrene-oxide-phenol reaction product) is reacted with an aldehyde such as formaldehyde, the resinous composition so formed is oil-soluble, which is suprising considering the fact that phenol-formaldehyde resins per se are not soluble in oils."

"Example.—28 grams (0.3 mol) of phenol was heated to boiling and then, over a period of about 30 minutes, 24 grams (0.2 mol) of styrene oxide was gradually added, with stirring. During the addition the temperature of the reaction mixture was maintained at from 150° C. to 180° C. and the reaction mixture became increasingly viscous. The product solidified to a dark, clear, brittle resin upon cooling. Removal of reation water and excess phenol was effected by distilling the reaction mixture to an oil-bath temperature of aproximately 185° C. at about 100 mm. of mercury pressure. There was thus obtained a hard, clear, amber-colored resin which had a sofetening point of 90° C. and flowed at a temperature of 130° C."

"The styrene oxide-phenol resin was insoluble in mineral spirits but soluble in xylene, dioxane and vegetable oils. Films cast from xylene solutions of the resin dried without residual tackiness."

The nature of the reaction product obtained following the procedure in the aforementioned Patent No. 2,422,637 apparently involves some reaction or reactions which are perhaps obscure or only partially understood. For instance, reference is made to the fact that water of reaction is removed. This suggests the possible conversion of the oxide into an unsaturated derivative, thus:

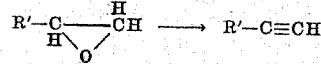

which would yield essentially a substituted acetylene. Such substituted acetylene, if formed, would probably convert by one of two ways into a resinous or oxygen-convertible material; the first being a conversion into a dimer in which both an acetylenic and ethylenic linkage appear, thus:

or else by the phenol present reacting with the acetylenic linkage of the dimer in the same way that acetylene can be employed to produce resins from phenols in which acetylene replaces formaldehyde or acetaldehyde. Such resins have been described in various U. S. patents, including U. S. Patent No. 2,499,365.

In any event, a resin so obtained presumably would dry without residual tackiness in the manner described in aforementioned U. S. Patent No. 2,422,637.

It is true that the present invention is not concerned with reactions involving styrene oxide, for example, and phenol, but styrene oxide and phenol-aldehyde resins of the kind described in Part 1 immediately preceding. However, the aforementioned U. S. Patent No. 2,422,367 states as follows:

"Other resinous materials can be included with the aralkylene oxide-phenol resins, either by addition to the raw ingredients or by incorporation with the finished product. During the condensation of the aralkylene oxide with the phenol or to the resulting product there may be added various amounts of, for example, such natural gums or resins as copal, gum elemi or colophony or derivatives thereof such as the rosin-glycerine esters; drying oils, alkyd resins or components thereof such as glycerine-phthalic anhydride resins or the glycerine-maleic anhydride resins; vinyl resins such as the styrene resins or the copolymers of styrene, the polyvinyl acetals or other known oil-soluble vinyl type resins; oil-soluble phenolic resins such as the para-tert-butylphenol-formaldehyde resin or the para-phenylphenol-formaldehyde resin; certain urea-aldehyde resins, melamine-aldehyde resins, etc."

Thus, by analogy whatever the reaction may be and how it takes place with the phenol-styrene oxide derivative is obscure although one might postulate that an acetylenic derivative acting as the equivalent of an aldehyde would combine with the phenol-aldehyde resins by virture of reactive hydrogen atoms which appear in the two end nuclei in a resin, such as the kind derived from para-tert-butylphenol and formaldehyde. However, this is merely speculation. Note what is said herein in regard to the products described in U. S. Patent No. 2,422,637 is not intended to evaluate or appraise the products therein described but is merely an effort to differentiate between the reactions that take place involving the elimination of water and the reaction that takes place in the course of the present procedure in which there is no elimination of water.

One property of the aforementioned resins described in U. S. Patent No. 2,422,637, is the property of drying or being oxygen-convertible. This characteristic is emphasized in the previous quotation, to wit: "The styrene oxide—phenol resin was insoluble in mineral spirits but soluble in xylene, dioxane and vegetable oils. Films cast from xylene solutions of the resin dried without residual tackiness."

The resin derivatives herein described do not have any such drying property which again seems to indicate the difference between the presence of unsaturated radicals of the kind previously described compared, with absence of such unsaturated radicals in the herein specified products. The herein included products can be characterized as non-drying or non-oxygen convertible.

Referring now to the idealized formula representing a resin as it previously appeared, thus

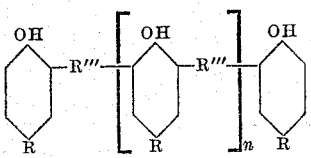

the reaction with styrene oxide or the equivalent in the instant invention may be understood by referring to the counterpart reaction involving the phenol and ethylene oxide in the following manner:

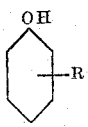

The above formula represents a phenol of the kind employed in making the resin. Common epoxides react to product resultants such as

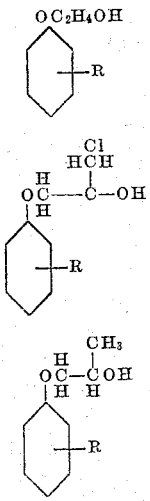

If, instead of propylene oxide, styrene oxide were employed, the methyl radical shown in the preceding formula becomes the phenyl radical, thus:

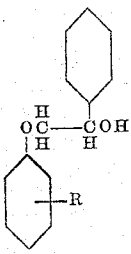

In essence, rewriting what has been said previously in terms of the aralkylene oxide previously described the formula becomes thus:

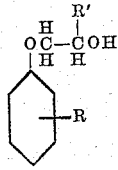

Stated another way, the aralkylene oxide previously described of the formula

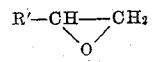

essentially does nothing more than to supply the divalent radical $R_1$ which in effect unites the phenolic oxygen atom with the hydroxyl hydrogen atom initially linked to it, thus

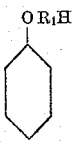

Or, stated another way, the monovalent radical $R_1H$ is simply thus:

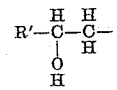

which, for convenience, may be described thus: $R''$.

Recapitulating what has been said, the action of an aralkylene oxide on such phenol then yields a compound which has been described thus:

Turning again to the idealized formula and assuming for sake of simplicity that the amount of aralkylene oxide added is just sufficient to combine with each phenolic hydroxyl, although, as pointed out subsequently, this does not follow, the reaction product would appear thus:

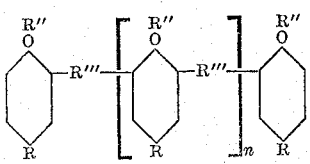

As pointed out previously it is not necessary to add sufficient of the aralkylene oxide to convert all the hydroxyl radicals of the phenol-aldehyde resin into the corresponding derivatives. It is necessary only that 2 or more be so converted. If only 2 were converted and assuming the 2 would be the hydroxyl radicals of the outside phenolic nuclei, then the preceding formula would be presented thus:

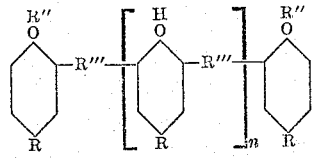

As a matter of fact, even when more than 2 moles of the aralkylene oxide are employed there is no proof one would necessarily attack the hydroxyl radicals of the inner phenolic groups in preference to the more readily available external hydroxyl groups. This is suggested merely by a theoretical consideration of steric hindrance.

Previously the radical $R''$ has been indicated thus:

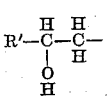

Rewriting one of the earlier formulas which shows the aralkylene oxide as having combined with the 2 terminal phenolic nuclei only the structure would be thus:

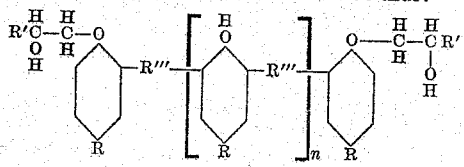

Additional moles of the aralkylene oxide, as previously suggested, may and probably do in at least some instances attack the external aliphatic hydroxyl radicals; for instance, the next 2 moles of aralkylene oxide reactant may enter the molecule, thus:

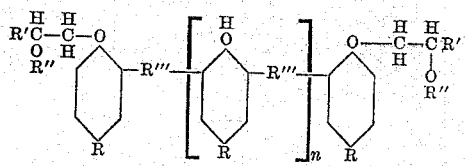

The aralkylene oxides act in the same way in the present instance as ethylene oxide, propylene oxide, butylene oxide, etc. The reaction may be catalyzed by the usual catalysts employed for such purposes which includes acidic catalysts, as well as basic catalysts. My preference is to use an alkaline catalyst, such as finely powdered sodium methylate, caustic soda, caustic potash, or the like. The amount used varies from one-tenth per cent up to a few tenths per cent. More can be used if desired. If the resin employed as a reactant has been obtained by the use of an alkaline catalyst and the catalyst still remains, the amount of added catalyst required may be moderately less.

It is to be noted in the instant reaction that the use of a catalyst is necessary. However, in the reaction involved in U. S. Patent No. 2,422,637, the preference is to conduct the reaction without a catalyst as noted in the patent in the following language: "While reaction is apparent even at room temperature, or slightly elevated temperatures, I prefer to operate at temperatures varying from about 120° C. to about 225° C. in the absence of catalysts."

Since the aralkylene oxides as employed, and particularly styrene oxide, represent liquids or solids having comparatively low volatility at room temperature one need not employ any special equipment. As a matter of fact, one can employ any of the usual apparatus used for resin manufacture or oxyalkylation with a nonvolatile epoxide, such as glycide or methylglycide. For instance, one could use an apparatus such as the resin pot described in U. S. Patent No. 2,499,365, dated March 7, 1950, to De Groote and Keiser. The reaction is simply permitted to take place, usually in presence of a solvent, until the molecular weight determination or a test for epoxide radicals shows that the reaction is complete, or substantially complete. At the completion of the reaction there is, of course, no epoxide radical remaining. The following examples will illustrate the procedure.

*Example AA*

This example will illustrate the preparation of a suitable end product from commercially available materials, such as a commercially available varnish resin, and commercially available styrene oxide. The particular varnish resin selected was one identified as BR-4036, which was a light colored, low melting resin, manufactured by the Bakelite Corporation, Bloomfield, New Jersey, and derived from amylphenol and formaldehyde. It had an average of 3½ phenolic units per molecule, and, for all practical purposes, corresponded almost identically with Resin 28a, previously described.

| | Grams |
|---|---|
| Styrene oxide | 600 |
| Resin BR-4036 | 880 |
| Sodium methylate | 20 |
| Benzene | 1000 |

The mixture of BR-4036 and sodium methylate in benzene was heated to 60° C. The styrene oxide was added gradually to the mixture. It took about ¼ hour to finish the addition. There was no apparent evolution of heat. The whole mixture was then heated for about 7 hours at a maximum temperature of 155° C.

*Example BB*

| | Grams |
|---|---|
| Styrene oxide | 840 |
| Resin BR-4036 | 350 |
| Sodium methylate | 30 |
| Benzene | 500 |

The mixture of resin BR-4036, sodium methylate and benzene was heated to 58° C. The ether was then added to the mixture and heated about 9 hours, at a maximum temperature of 160° C.

*Example CC*

| | Grams |
|---|---|
| Styrene oxide | 1080 |
| Resin BR-4036 | 350 |
| Sodium methylate | 35 |
| Xylene | 1000 |

The mixture of BR-4036, sodium methylate and xylene was heated to about 70° C. The styrene oxide was then added to the mixture, and the whole heated for about 10 hours at a maximum temperature of 148° C.

Other examples prepared in instances where the amount of reactant available, particularly the aralkylene oxide, was limited are illustrated in the following table.

TABLE II

| Ex. No. | Resin used | Amt. used, grs. | Aralkylene oxide used | Amt. used, grs. | Mol. wt. of resin | Probable OH group in resin mol. | Aralkylene oxide to resin mol. | Solvent | Amt. solvent used, grs. | Sod. meth. used, grs. | Time of reaction, hrs. | Max. temp. of reaction |
|---|---|---|---|---|---|---|---|---|---|---|---|---|
| 1c | 5a | 96 | Styrene oxide | 24 | 959.5 | 5.5 | 2:1 | Xylene | 100 | 1.3 | 4.5 | 158 |
| 2c | 5a | 96 | do | 66 | 959.5 | 5.5 | 5.5:1 | do | 100 | 1.9 | 6.5 | 161 |
| 3c | 5a | 96 | do | 100 | 959.5 | 5.5 | 8.3:1 | do | 100 | 2.4 | 9.0 | 160 |
| 4c | 5a | 96 | do | 132 | 959.5 | 5.5 | 11:1 | do | 100 | 2.2 | 9.4 | 162 |
| 5c | 28a | 121 | Paramethyl styrene oxide | 78.5 | 604.0 | 3.5 | 2:1 | do | 100 | 2.0 | 8.0 | 152 |
| 6c | 28a | 60.4 | do | 69.0 | 604.0 | 3.5 | 3.5:1 | do | 100 | 1.6 | 7.5 | 158 |
| 7c | 28a | 60.4 | do | 104.0 | 604.0 | 3.5 | 5.3:1 | do | 100 | 1.7 | 8.5 | 162 |
| 8c | 28a | 60.4 | do | 133.0 | 604.0 | 3.5 | 7:1 | do | 100 | 2.0 | 8.0 | 165 |
| 9c | 35a | 102.8 | Paramethoxy styrene oxide | 52.6 | 102.8 | 4.0 | 2:1 | do | 100 | 1.7 | 7.6 | 165 |
| 10c | 35a | 102.8 | do | 108.0 | 1028 | 4.0 | 4:1 | do | 100 | 2.2 | 9.1 | 159 |
| 11c | 35a | 102.8 | do | 158.0 | 1028 | 4.0 | 6:1 | do | 100 | 2.4 | 9.0 | 155 |
| 12c | 35a | 102.8 | do | 210.0 | 1028 | 4.0 | 8:1 | do | 100 | 3.4 | 10.0 | 152 |
| 13c | 37a | 63.6 | Paraphenyl styrene oxide | 72.0 | 636 | 4.0 | 2:1 | do | 100 | 1.0 | 5.5 | 161 |
| 14c | 37a | 63.6 | do | 145.0 | 636 | 4.0 | 4:1 | do | 100 | 1.6 | 6.8 | 159 |
| 15c | 37a | 63.6 | do | 218.0 | 636 | 4.0 | 6:1 | do | 100 | 2.4 | 9.0 | 157 |
| 16c | 37a | 63.6 | do | 291.0 | 636 | 4.0 | 8:1 | do | 100 | 2.9 | 9.5 | 163 |

The resins which are employed as raw materials vary from fairly high melting resins to resins melting near the boiling point of water, to other products whose melting point is only moderately above ordinary room temperature. Such resins vary in color from almost water-white to products which are dark amber or reddish amber in appearance. In some instances they are tacky solids, or even liquids at ordinary temperatures. After treatment with an aralkylene oxide of the kind herein employed the resultant product is usually at least as dark, perhaps darker, than the initial resin. The solvent can be removed readily by distillation, particularly vacuum distillation. The product obtained after treatment with the aralkylene oxide is apt to be somewhat softer or more liquid than the original material. In some instances a tackiness develops which is suggestive of cross-linking in some obscure manner. Where the product is subsequently subjected to further reaction as described in Part 4 immediately following, there is nothing to be gained by removal of the solvent.

PART 4

Having obtained the modified phenol-aldehyde resins of the kind herein described they may be employed for various purposes, such as the manufacture of varnishes in the manner described in regard to ordinary phenol-aldehyde resins (prior to treatment with aralkylene oxide) as described in U. S. Patent No. 2,610,955, dated September 16, 1952, to De Groote and Keiser; or they may be subjected to oxyalkylation, particularly with ethylene oxide or propylene oxide so as to produce derivatives suitable for the resolution of petroleum emulsions as described in U. S. Patent No. 2,499,365, dated March 7, 1950, to De Groote and Keiser; or they may be reacted with epoxides containing a basic nitrogen atom such as

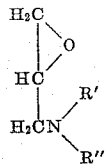

wherein R' and R'' are alkyl groups, as described in U. S. 2,520,093, dated August 22, 1950, to Gross; or they may be reacted with imines such as ethylene imine or propylene imine to produce products which are valuable as cationic surface-active agents. Such last mentioned derivatives, i. e., those containing at least one basic nitrogen atom may, in turn, be reacted further with an alkylene oxide such as ethylene oxide or propylene oxide.

Having thus described my invention, what I claim as new and desire to secure by Letters Patent, is:

1. The process of conducting an oxyalkylation reaction without elimination of water between (A) aralkylene oxide, and (B) an oxyalkylation-susceptible, fusible, organic solvent-soluble, water-insoluble phenol-aldehyde resin; said resin being derived by reaction between a difunctional monohydric phenol and an aldehyde having not over 8 carbon atoms and having one functional group reactive toward said phenol; said resin being formed in the substantial absence of phenols of functionality greater than 2; said phenol being of the formula

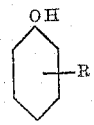

in which R is a hydrocarbon radical having not more than 24 carbon atoms and substituted in one of the positions ortho and para, with the proviso that there be employed at least 2 moles of the aralkylene oxide for each mole of resin; and with the final proviso that the reaction product be organic solvent-soluble; and said reaction between (A) and (B) be conducted below the pyrolytic point of the reactants and resultants of reaction.

2. The process of conducting an oxyalkylation reaction without elimination of water between (A) an aralkylene oxide being a member of the class consisting of styrene oxide; nuclearly alkyl substituted styrene oxides; nuclearly alkoxy substituted styrene oxides; nuclearly arylated styrene oxides and aralkylene oxides containing condensed ring nuclei; and (B) an oxyalkylation-susceptible, fusible, organic solvent-soluble, water-insoluble phenol-aldehyde resin; said resin being derived by reaction between a difunctional monohydric phenol and an aldehyde having not over 8 carbon atoms and having one functional group reactive toward said phenol; said resin being formed in the substantial absence of phenols of functionality greater than 2; said phenol being of the formula

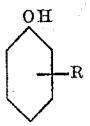

in which R is a hydrocarbon radical having not more than 24 carbon atoms and substituted in one of the positions ortho and para, with the proviso that there be employed at least 2 moles of the aralkylene oxide for each mole of resin; and with the final proviso that the reaction product be organic solvent-soluble; and said reaction between (A) and (B) be conducted below the pyrolytic point of the reactants and resultants of reaction.

3. The process of conducting an oxyalkylation reaction without elimination of water between (A) styrene oxide, and (B) an oxyalkylation-susceptible, fusible, organic solvent-soluble, water-insoluble phenol-aldehyde resin; said resin being derived by reaction between a difunctional monohydric phenol and an aldehyde having not over 8 carbon atoms and having one functional group reactive toward said phenol; said resin being formed in the substantial absence of phenols of functionality greater than 2; said phenol being of the formula

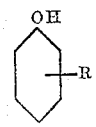

in which R is a hydrocarbon radical having not more than 24 carbon atoms and substituted in one of the positions ortho and para, with the proviso that there be employed at least 2 moles of the styrene oxide for each mole of resin; and with the final proviso that the reaction product be organic solvent-soluble; and said reaction between (A) and (B) be conducted below the pyrolytic point of the reactants and resultants of reaction.

4. The process of claim 3 wherein R has at least 4 and not over 14 carbon atoms.

5. The process of claim 3 wherein R has at least 4 and not over 14 carbon atoms, and with the proviso that the amount of styrene oxide employed be at least 2 moles per resin molecule and not more than twice the number of hydroxyl groups in the resin molecule.

6. The process of claim 3 wherein R has at least 4 and not over 14 carbon atoms, and with the proviso that the amount of styrene oxide employed be at least 2 moles per resin molecule and not more than twice the number of hydroxyl groups in the resin molecule, said reaction being conducted in the presence of an alkaline catalyst.

7. The product obtained by the process described in claim 1.

8. The product obtained by the process described in claim 5.

References Cited in the file of this patent

UNITED STATES PATENTS

| | | |
|---|---|---|
| 2,385,970 | De Groote et al. | Oct. 2, 1945 |
| 2,422,637 | Thomas | June 17, 1947 |
| 2,574,546 | De Groote | Nov. 13, 1951 |